Feb. 18, 1941.  W. BAECKLER  2,231,871
IRRADIATING PROCESS AND APPARATUS
Original Filed March 31, 1934
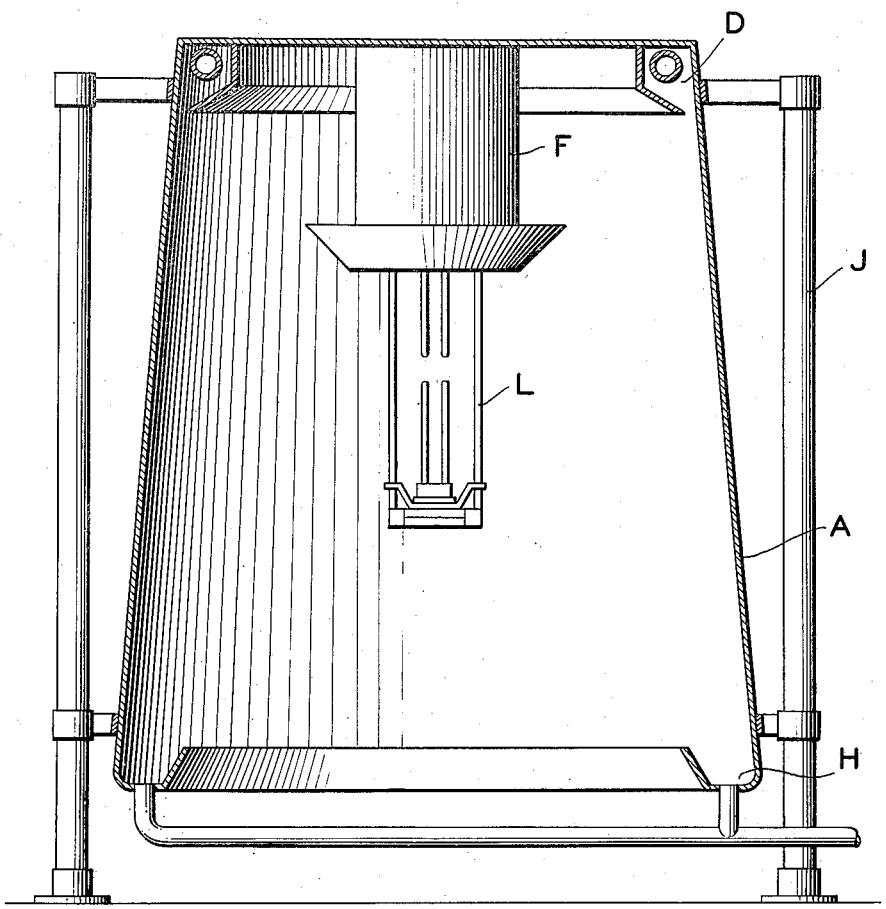
INVENTOR
WALTER BAECKLER
BY
ATTORNEY Patented Feb. 18, 1941

2,231,871

UNITED STATES PATENT OFFICE 2,231,871

IRRADIATING PROCESS AND APPARATUS

Walter Baeckler, Lakewood, Ohio, assignor, by mesne assignments, to Union Carbide and Carbon Corporation, a corporation of New York Original application March 31, 1934, Serial No. 718,403. Divided and this application September 21, 1938, Serial No. 230,950

9 Claims. (Cl. 250—49)

This invention relates to means and process for irradiating substances with radiant energy in order to modify the properties thereof or to produce new properties therein. It is especially adapted for use in the irradiation of liquids. Various types of radiant energy may be used, but the invention will be particularly described in connection with the irradiation of liquids with ultraviolet energy. The use of ultraviolet energy for the irradiation of food and other products is of constantly increasing commercial importance, and I have devised a novel form of irradiating apparatus in which means are provided for the retardation and regulation of the speed of travel and length of exposure of the liquid passing through the irradiating apparatus.

An object of the invention is to devise an apparatus so arranged as to give the liquid as nearly as possible a constant speed or progress during irradiation, and at the same time to provide for adequate mixing to the end that all portions and particles of the material being irradiated will be equally exposed to the source of radiant energy.

Another object of my invention is to produce a type of apparatus for use in the irradiation of liquids which will permit the irradiation of a maximum amount of liquids in a given time without causing the liquid to splash.

Another object of my invention is to devise a process in which liquid to be irradiated is flowed by gravity over a surface and held there by surface tension.

A further object of my invention is to produce a simple and inexpensive type of apparatus which will be rugged, durable, and easy of operation and maintenance.

Other objects of the invention will in part be obvious and will in part appear hereinafter.

In irradiating fluids such as milk, it is customary to pass the milk in a thin film over a surface, and to expose the liquid to ultraviolet energy while in such form. By this irradiation certain well-known beneficial effects are produced, and the securing of different effects may require modifications in the arrangement of the surface over which the liquid flows and its position with respect to the source of radiation. Accordingly, various types of irradiating apparatus are required to give the irradiation which is considered most efficient under various circumstances. The form of apparatus disclosed herein is especially designed to give an approximately uniform rate of flow over the surface upon which the liquid being irradiated flows.

For a fuller understanding of the nature and objects of the invention, reference should be had to the following detailed description taken in connection with the accompanying drawing.

In this drawing are shown a stationary surface A, supported by a suitable standard J, surrounding a source of energy L which is supported by any convenient means, as by a support F. The source of energy L is represented as a carbon arc lamp, which has been found to be a very efficient source of ultraviolet energy. However, other sources of ultraviolet energy, or sources of other types of radiant energy, may be employed. A duct, or other means, may be provided for removing fumes or gaseous products during the production of radiant energy.

The liquid to be irradiated is supplied at D and is collected at H. The casing A, the interior surface of which serves as a support for the film to be irradiated, is arranged in the form of the frustrum of a cone with its larger diameter at the bottom. The purpose of the provision of the conical type of support is to maintain the rate of flow of the liquid being irradiated more nearly constant. During the travel of the liquid down the interior of the casing, the film tends to spread out and become thinner as a result of an increased speed of flow over the surface. By increasing the diameter of the casing, there is a still further decrease in the thickness of the film of the liquid. However, with a marked decrease of the thickness of the film there is a sharp reduction in the speed of flow of the film over the supporting surface. This may be due to the fact that a larger proportion of the film is in frictional engagement with the supporting surface. That is to say, an increase in the speed of travel of the film tends to decrease the thickness of the film if the liquid is supplied at a constant rate; yet a decrease in the thickness of the film tends to decrease the speed of travel, but to a lesser extent. Thus, a uniform speed will not be reached in vertical flow in the distance required for commercial irradiation. With a conical surface the speed becomes more nearly constant. This may be due to the fact that the distance traveled is greater than its vertical component; it may be due to the fact that the decrease in thickness is greater than that caused by the increased speed of travel. Whatever the cause may be, it has been found that, by using a conical surface, a decrease in the speed of flow results.

Also there is a movement with the film due to the spreading thereof which gives a turbulent effect resulting from the lateral movement of the particles to cover the increased surface, which thus exposes all particles to the irradiating energy.

It is known that it has been proposed to treat liquids with radiant energy while maintaining the liquid on the interior surface of a cone. However, this has been done by rotating the cone so that the liquid is held thereagainst by centrifugal force. It has not been realized heretofore that, by making the angle at the vertex of a stationary cone very small, it is possible to maintain a film of liquid on the interior surface solely by surface tension. The means provided by the present invention for the retardation of the speed of travel and for mixing the material may be used to advantage, in accordance with the objects thereof, for the more precise regulation of the length of exposure of the material, to the end that all particles of the material being irradiated will be exposed equally to the source of radiant energy. The apparatus and process herein described are particularly well adapted for the irradiation of milk. This statement is not to be construed as a limitation, as I am well aware that the apparatus can be used with a variety of liquids.

The present application is a division of my co-pending application filed March 31, 1934, Serial No. 718,403 (Patent No. 2,139,403, dated December 13, 1938).

I claim:

1. A liquid irradiating apparatus comprising a source of radiant energy, and means forming a stationary downwardly extending surface for flow thereover of liquid to be irradiated by energy from said source, said surface being curved continuously about a vertical axis and the horizontal dimension of said surface, measured along the curved lines of intersection with said surface of horizontal planes cutting said axis, increasing from the top to the bottom, said surface being so positioned relative to the vertical that liquid flowing thereover is unsupported from beneath and the rate of increase of said horizontal dimension being so gradual that liquid flowing over said surface is maintained in contact with said surface solely by the attraction of such liquid for such surface.

2. Means for irradiating liquids comprising a source of radiant energy, and means forming a surface in the shape of the frustrum of a cone, with a vertical axis, surrounding said energy source, said surface being stationary and having its smaller diameter at the top, the walls of said surface approaching the vertical so closely that the liquid being irradiated is retained in contact therewith solely by surface tension, and means for supplying liquid to and collecting liquid from said surface.

3. Apparatus for irradiating milk comprising a source of ultraviolet energy, and means forming a smooth surface in the shape of the frustrum of a cone, with a vertical axis, surrounding said energy source, said means being stationary and said surface having its smaller diameter at the top, the walls of said surface approaching the vertical so closely that the milk being irradiated is retained in contact therewith solely by surface tension, and means for supplying milk to and collecting milk from said surface.

4. Process of irradiating milk which comprises flowing the milk downwardly in a thin film over a smooth surface under the influence of gravity, gradually decreasing the thickness of said thin film without substantially increasing the speed of travel of said milk and while the milk is flowing in such direction, at an angle to the vertical, that it is retained in contact with said surface solely by surface tension; and subjecting the milk to radiation from a source of ultraviolet energy while it is in motion.

5. Process of irradiating milk which comprises flowing the milk downwardly in a thin film over a smooth curved surface under the influence of gravity, and in such direction, at an angle to the vertical, that the milk is retained in contact with said surface solely by surface tension; retarding the speed of flow of the milk by gradually increasing the surface area of said film while simultaneously decreasing gradually the thickness of the film; and subjecting the milk to radiation from a source of ultraviolet energy while it is in motion.

6. Process of irratiating milk which comprises flowing the milk downwardly in a thin film over a smooth curved surface under the influence of gravity, and in such direction, at an angle to the vertical, that the milk is retained in contact with said surface solely by surface tension and subjecting the flowing milk to radiation from a source of ultraviolet energy while retarding the speed of flow of the milk by gradually decreasing the thickness of said film and increasing the surface area of the milk film being irradiated.

7. Process of irradiating liquid which comprises flowing the liquid downwardly in a thin film over a smooth surface under the influence of gravity, gradually decreasing the thickness of said thin film without substantially increasing the speed of travel of said milk while the liquid is flowing in such direction, at an angle to the vertical, that it is retained in contact with said surface solely by surface tension; and subjecting the liquid to radiation from a source of ultraviolet energy while it is in motion.

8. Process of irradiating liquid which comprises flowing the liquid downwardly in a thin film over a smooth curved surface under the influence of gravity, and in such direction, at an angle to the vertical, that the milk is retained in contact with said surface solely by surface tension; retarding the speed of flow of the liquid by gradually increasing the surface area of said film while simultaneously decreasing gradually the thickness of the film; and subjecting the liquid to radiation from a source of ultraviolet energy while it is in motion.

9. Process of irradiating liquid which comprises flowing the liquid downwardly in a thin film over a smooth curved surface under the influence of gravity, and in such direction, at an angle to the vertical, that the milk is retained in contact with said surface solely by surface tension; and subjecting the flowing liquid to radiation from a source of ultraviolet energy while retarding the speed of flow of the liquid by gradually decreasing the thickness of said film and increasing the surface area of the liquid film being irradiated.

WALTER BAECKLER.